(12) United States Patent
Strein

(10) Patent No.: US 9,183,841 B2
(45) Date of Patent: Nov. 10, 2015

(54) IDENTIFICATION OF WATERMARKED CONTENT

(71) Applicant: Disney Enterprises, Inc., Burbank, CA (US)

(72) Inventor: Michael J. Strein, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/948,018

(22) Filed: Jul. 22, 2013

(65) Prior Publication Data

US 2015/0023546 A1 Jan. 22, 2015

(51) Int. Cl.
*H04L 29/00* (2006.01)
*G10L 19/018* (2013.01)
*H04L 9/00* (2006.01)

(52) U.S. Cl.
CPC ............... *G10L 19/018* (2013.01); *H04L 9/00* (2013.01)

(58) Field of Classification Search
CPC .................................. H04L 9/00; G06F 21/00
USPC .......................................................... 713/176
See application file for complete search history.

(56) References Cited

U.S. PATENT DOCUMENTS 7,266,697 B2 * 9/2007 Kirovski et al. ............... 713/176
8,099,601 B2 * 1/2012 Serret-Avila et al. ......... 713/176

OTHER PUBLICATIONS

Serap Kirbiz, Yener Ulker, Bilge Gunsel/ A pattern recognition framework to blind audio watermark decoding/ Oct. 2007/Science Direct/pp. 92-102.*

* cited by examiner

*Primary Examiner* — Anthony Brown
*Assistant Examiner* — Michael D Anderson
(74) *Attorney, Agent, or Firm* — Farjami & Farjami LLP

(57) ABSTRACT

There are provided methods and systems for identifying watermarked content. In one implementation, such a method includes receiving content including a digital watermark, and detecting the digital watermark, the detecting being performed without use of a decoder configured to read the digital watermark. In implementations in which the content includes an audio watermark, detecting the audio watermark includes filtering an audio frequency spectrum of the content, sampling the audio frequency spectrum to generate data corresponding to the content, determining a first audio level for searching the data based on the sampling, and searching the data at the first audio level. The content may be identified as watermarked content including an audio watermark when multiple, single frequency tones are detected.

14 Claims, 4 Drawing Sheets

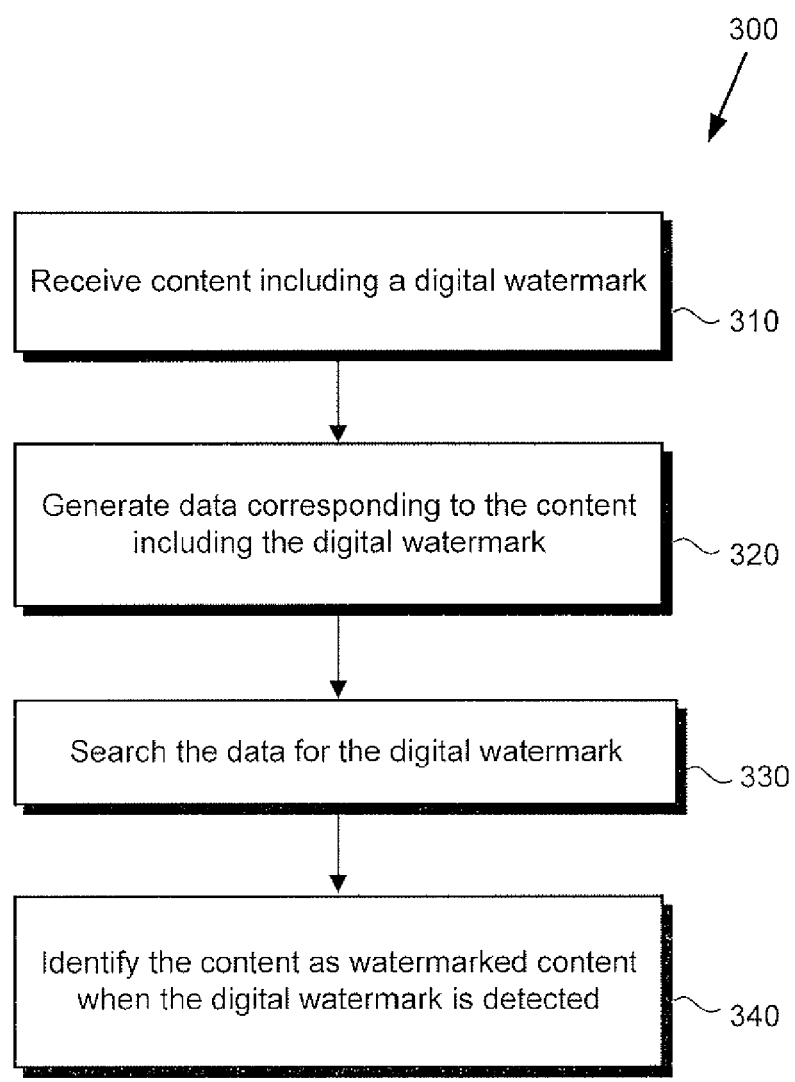

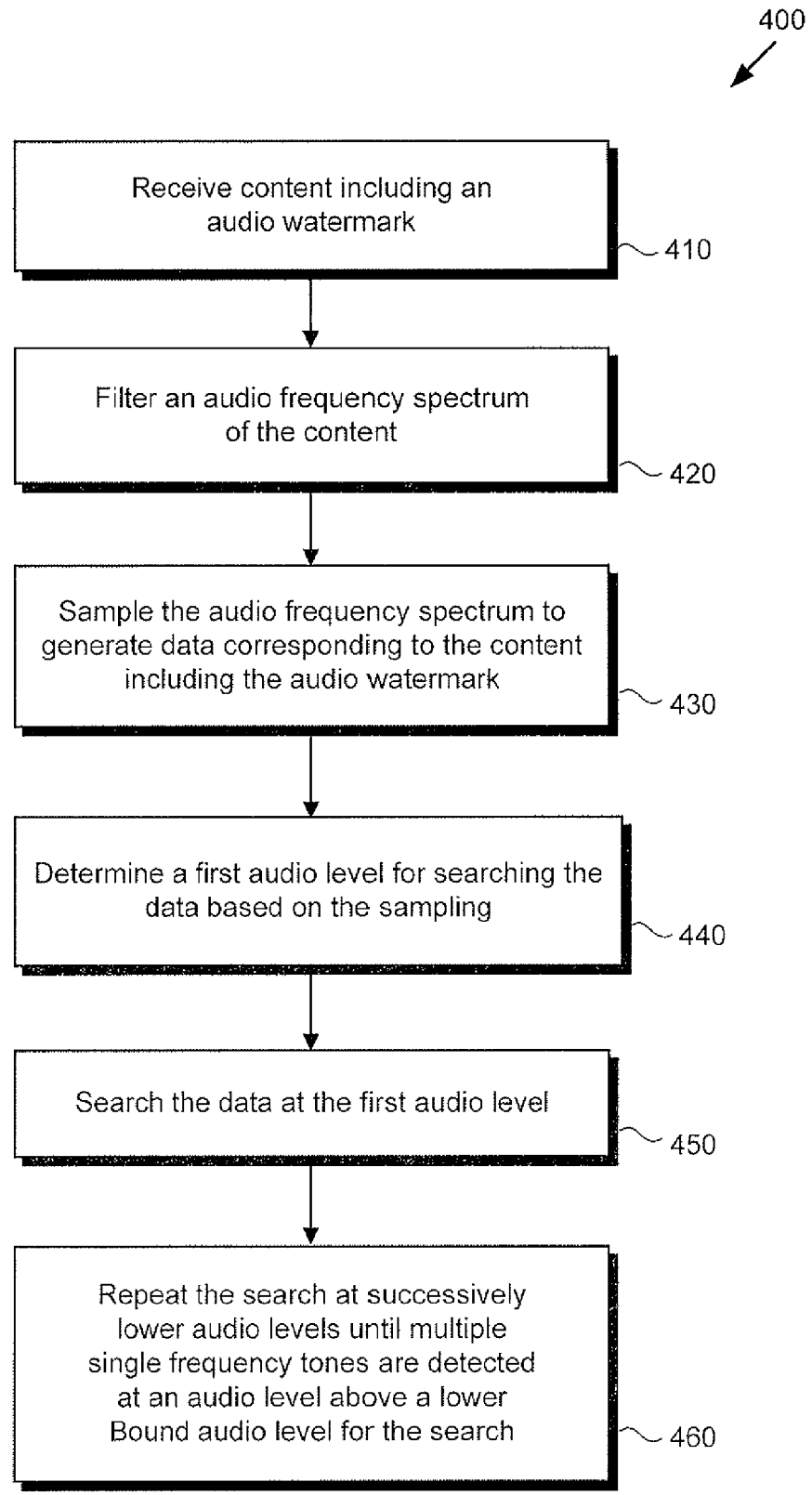

IDENTIFICATION OF WATERMARKED CONTENT

BACKGROUND

Digital watermarking is a technique for embedding data in electronic content, such as audio-visual content, for example. A digital watermark is intended to go unnoticed by an ordinary consumer of the electronic content, but carries information that may be used for a variety of purposes. For example, an audio watermark embedded in an audio file or the audio component of audio-visual content is inaudible to a listener, but may be used to identify the producer or distributor of the content, or may identify the point of origin of the electronic file carrying the content. In addition, in the context of television (TV) transmission, watermarks may be used by rating agencies to track and identify programming content.

Communication of information via digital watermarks typically requires use of an encoder to embed the watermark into the content before its transmission, and use of a complimentary decoder for extracting or "reading" the watermark by its intended recipient. Without such a complementary decoder, a digital watermark embedded in content cannot be read, or even detected. In addition to their many legitimate uses, however, digital watermarks may be used by a contributor of content to a TV transmission to use that transmission as a vehicle for unauthorized communications. Those unauthorized communications may be undesirable for several reasons. For example, the TV network providing the transmission that includes the content carrying the unauthorized watermark is typically the Federal Communication Commission (FCC) licensee for the transmission, and may bear liability for the embedded watermark communication despite being ignorant of its presence. Consequently, a solution is needed for enabling identification of watermarked content as such without requiring use of the complementary decoder configured to detect and read a digital watermark.

SUMMARY

There are provided methods and systems for identifying watermarked content, substantially as shown in and/or described in connection with at least one of the figures, and as set forth more completely in the claims.

BRIEF DESCRIPTION OF THE DRAWINGS

FIG. 3 is a flowchart presenting an exemplary method for use by a content distribution system to identify watermarked content; and FIG. 4 is a flowchart presenting an exemplary method for use by a content distribution system to identify content including an audio watermark.

DETAILED DESCRIPTION

Figure 1:
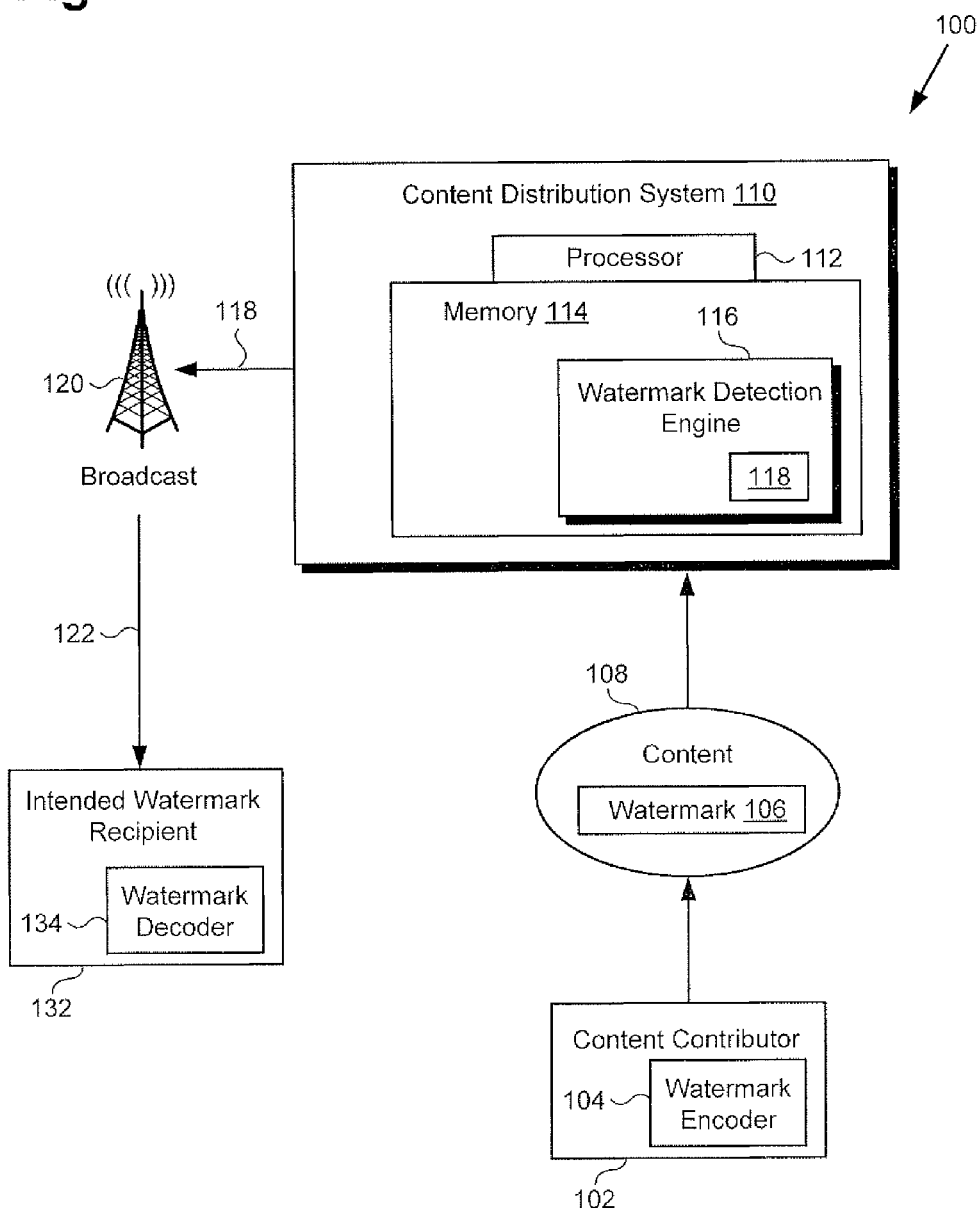
FIG. 1 shows a diagram of a content distribution environment including an exemplary content distribution system configured to identify watermarked content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, digital watermarking is a technique for embedding data in electronic content. The digital watermark is intended to go unnoticed by an ordinary consumer of the content, but carries information that may be used for a variety of purposes. For example, a digital watermark in the form of an audio watermark embedded in an audio file, or in the audio component of audio-visual content, is inaudible to a listener, but may be used to identify the producer or distributor of the content, or may identify the point of origin of the electronic file carrying the content. Moreover, in the context of television (TV) transmission, digital watermarks may be used by rating agencies to track and identify programming content.

As also noted above, communication of information via digital watermarks typically requires use of an encoder to encode the watermark data into the content before its transmission, and use of a complimentary decoder for extracting or "reading" the watermark by its intended recipient. Without such a complementary decoder, a digital watermark encoded into content cannot be read, or even detected according to the conventional art.

Unfortunately, however, in addition to their many legitimate uses, digital watermarks can be used by a contributor of content to a TV transmission in order to utilize the TV transmission as a vehicle for unauthorized communications. Those unauthorized communications may be undesirable for several reasons. For example, such a practice may enable the contributor of the unauthorized content to "free ride" on the TV transmission without remitting fair compensation to the providers of the TV transmission stream, or to producers of content included in the transmission stream and adding to its value. In addition, the TV network or other entity providing the transmission that includes the unauthorized watermarked content is typically the Federal Communication Commission (FCC) licensee for the transmission, and may bear liability for the embedded watermark communication despite being ignorant of its presence.

The present application discloses a solution enabling identification of unauthorized watermarked content as watermarked content without requiring use of the complementary decoder configured to read the digital watermark, which is typically required for watermark detection in the conventional art. In addition, the present solution may be implemented so as to identify watermarked content already scheduled for use in a transmission stream, in real-time with respect to the transmission stream, thereby enabling dynamic blocking or substitution of the watermarked content so as to prevent unauthorized communications.

Although various implementations make references to a TV transmission stream, that characterization is merely an example provided. More generally, the solution for identifying watermarked content of the present application is applicable to content distributed using other transmission modes. For example, in some implementations, the present solution for identifying watermarked content may be applied to content streamed or otherwise transmitted over a packet network, such as the Internet.

FIG. 1 shows a diagram of content distribution environment 100 including exemplary content distribution system 110 configured to identify watermarked content, according to one implementation. In addition to content distribution system 110, content distribution environment 100 includes content contributor 102 having watermark encoder 104, content 108, such as electronic content, including digital watermark 106, transmitter 120, and intended watermark recipient 132 having watermark decoder 134. As shown in FIG. 1, content distribution system 110 includes system processor 112, and system memory 114 storing watermark detection engine 116. Also shown in FIG. 1 are data 118 corresponding to content 108, transmission content 118 provided to transmitter 120 by content distribution system 110, and transmission stream 122 provided by transmitter 120.

It is noted that, although FIG. 1 depicts watermark detection engine 116 as being located in an integrated system memory 114, that representation is merely provided as an aid to conceptual clarity. More generally, content distribution system 110 may include one or more media distribution servers, which may be co-located, or may form an interactively linked but distributed system. As a result, system processor 112 and system memory 114 may correspond to distributed system processor and system memory resources.

According to the implementation shown by FIG. 1, content distribution system 110 is configured to mediate distribution of content as transmission content 118 so as to prevent the unauthorized use of transmission stream 122 for distribution of content 108 including digital watermark 106. In one such implementation, content distribution system 110 may correspond to one or more web servers, configured to receive content 108 from content contributor 102 over a packet network such as the Internet, for example. Alternatively, content distribution system 110 may correspond to one or more media servers supporting a local area network (LAN), or included in another type of limited distribution network within a TV network control center, for example.

As shown in FIG. 1, watermark detection engine 116, under the control of system processor 112, may receive content 108 including digital watermark 106, which may be an audio watermark for example. According to the implementation shown in FIG. 1, watermark detection engine 116 is configured to detect digital watermark 106 included in content 108. Moreover, watermark detection engine 116 is configured to detect digital watermark 106 without use of watermark decoder 134, and without access to a corresponding decoding algorithm for interpreting or reading digital watermark 106.

It is noted that, due to the omission of watermark decoder 134 or its corresponding decoding algorithm as a resource available to watermark detection engine 116, watermark detection engine 116 may be unable to read or interpret digital watermark 106. Nevertheless, and despite the omission of watermark decoder 134 or its corresponding decoding algorithm as a resource available to watermark detection engine 116, watermark detection engine is configured to detect digital watermark 106 and thereby identify content 108 as watermarked content.

Figure 2:
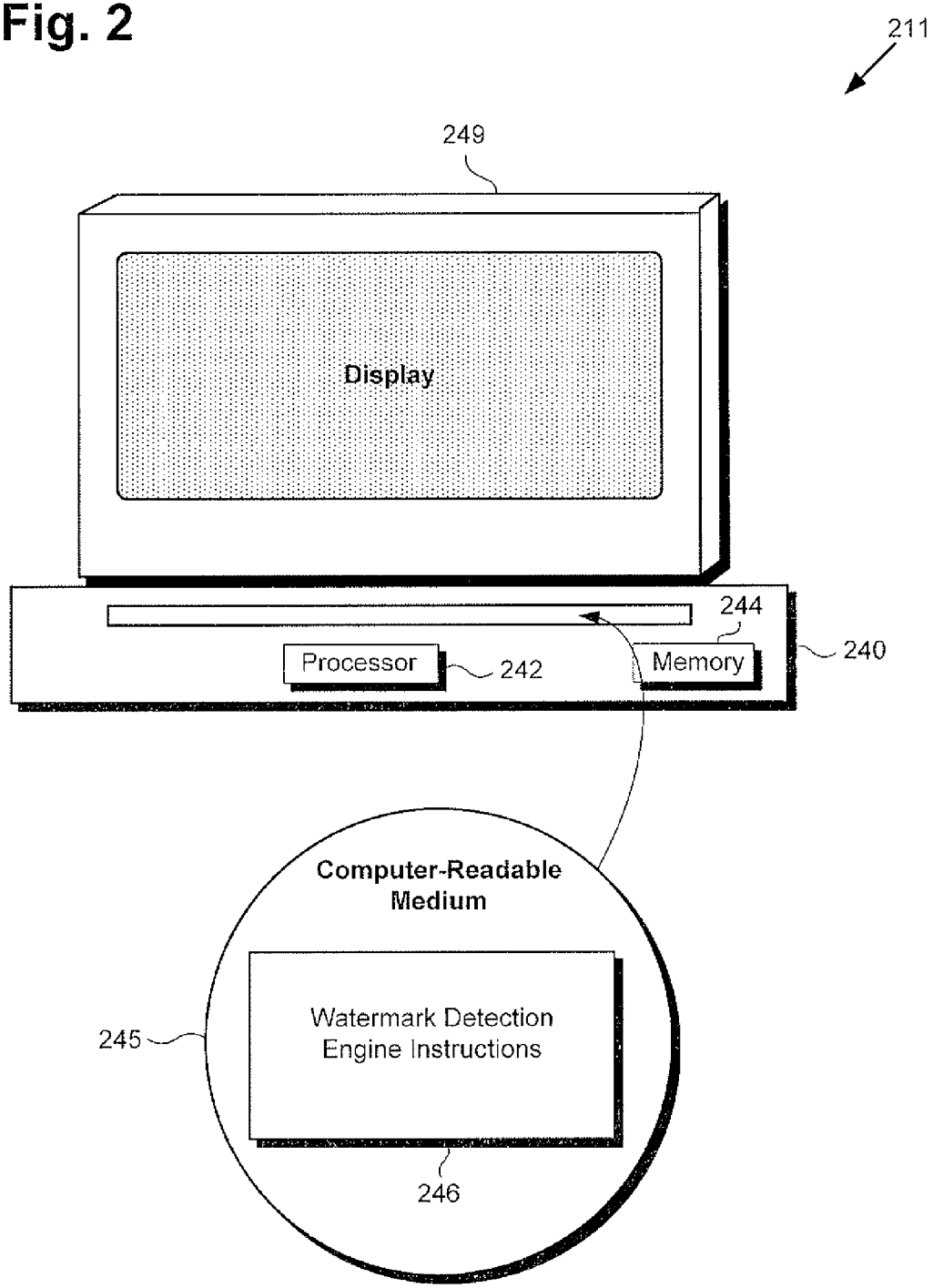
FIG. 2 shows an exemplary content distribution system work station and a computer-readable medium including instructions enabling identification of watermarked content, according to one implementation.

Referring now to FIG. 2, FIG. 2 shows an exemplary content distribution system work station and a computer-readable medium including instructions enabling identification of watermarked content, according to one implementation. Work station 211 includes computer 240 including processor 242 and memory 244, interactively linked to display 249. Also shown in FIG. 2 is computer-readable medium 245 having watermark detection engine instructions 246 stored thereon. Work station 211 may be a feature of a content distribution system corresponding to content distribution system 110, in FIG. 1. Although work station 211 is shown as a desktop unit in FIG. 2, that representation is also provided merely as an example. In other implementations, work station 211 may be another type of stationary, portable, or mobile computing device or system. For example, workstation 211 may take the form of a laptop computer, tablet computer, or mobile communication device suitably equipped to receive computer readable medium 245, for example.

The expression "computer-readable medium," as used in the present application, refers to any medium that provides instructions to processor 242 of computer 240. Thus, a computer-readable medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable media include, for example, an optical disc, RAM, programmable read-only memory (PROM), erasable PROM (EPROM), and FLASH memory.

According to the implementation shown by FIG. 2, computer-readable medium 245 provides watermark detection engine instructions 246 for execution by processor 242. Watermark detection engine instructions 246, when executed by processor 242, instantiate a watermark detection engine on work station 211 corresponding to watermark detection engine 116, in FIG. 1, and capable of performing all of the operations attributed to watermark detection engine 116 herein.

Example implementations will now be further described with reference to FIGS. 3 and 4. FIG. 3 shows flowchart 300 presenting an exemplary method for use by a content distribution system to identify watermarked content. FIG. 4 shows flowchart 400 presenting a more detailed exemplary method for use by a content distribution system to identify content including an audio watermark. With respect to the methods outlined in FIGS. 3 and 4, it is noted that certain details and features have been left out of respective flowcharts 300 and 400 in order not to obscure the discussion of the example implementations in the present application.

Referring first to flowchart 300, with additional reference to FIG. 1, flowchart 300 begins with receiving content 108 including digital watermark 106 (310). As shown in FIG. 1, content 108 may be received by content distribution system 110 from content contributor 102. For example, in one implementation, content 108 including digital watermark 106 may be received by content distribution system 110 and may then be transferred internally so as to be received by watermark detection engine 116.

As noted above, in addition to its possible legitimate use, digital watermark 106 can be used by content contributor 102 in an attempt to utilize transmission content 118 and transmission stream 122 for unauthorized communication with intended watermark recipient 132. Transmission stream 122 may be a TV transmission stream including programming content and advertising content, for example. In one implementation, content 108 may include advertising content in the form of audio-visual content, for example, and content 108 may be scheduled for use in transmission stream 122. Digital watermark 106 may represent an unauthorized communication including information in the form of data intended to be received by intended watermark recipient 132, and to be read or otherwise interpreted using watermark decoder 134 configured for that purpose.

Flowchart 300 continues with generating data 118 corresponding to content 108 including digital watermark 106

(320). Generation of data 118 corresponding to content 108 may be performed by watermark detection engine 116 of content distribution system 110, under the control of system processor 112. For example, in some implementations, watermark detection engine 116 may be configured to filter and/or sample content 108 to generate data 118.

Flowchart 300 continues with searching data 118 for evidence of digital watermark 106 in content 108 (330). The search of data 118 may be performed by content distribution system 110, using watermark detection engine 116 under the control of system processor 112. Such searching may include scanning data 118 at one or more levels of resolution, or at one or more levels of sensitivity, for example, for watermark characteristic data within data 118.

Flowchart 300 may conclude with identifying content 108 as watermarked content when digital watermark 106 is detected (340). Detection of digital watermark 106 and identification of content 108 as watermarked content may be performed by content distribution system 110, using watermark detection engine 116 under the control of system processor 112. Detection of digital watermark 106 may result from detection by watermark detection engine of watermark characteristic data within data 118 during the searching (330). As a result, the present method enables detection of digital watermark 108 without use of watermark decoder 134.

As noted above, in some instances, digital watermark 106 may take the form of an audio watermark embedded in an audio portion of content 108, such as in the audio component of audio-visual content. Flowchart 400, in FIG. 4, presents a more detailed exemplary method for use by content distribution system 110, in FIG. 1, to identify content 108 including an audio watermark.

Flowchart 400 begins with receiving content 108 including digital watermark 106 in the form of an audio watermark (hereinafter "audio watermark 106") (410). As explained above, content 108 may be received by content distribution system 110 from content contributor 102. As further explained above, in one implementation, content 108 including audio watermark 106 may be received by content distribution system 110 and may then be transferred internally so as to be received by watermark detection engine 116.

Flowchart 400 continues with filtering an audio frequency spectrum of content 108 (420). Filtering of the audio frequency spectrum of content 108 may be performed by content distribution system 110, using watermark detection engine 116 under the control of system processor 112. For example, where content 108 is audio-visual content including audio watermark 106, the audio segment of content 108 may be filtered so as to isolate an audio frequency spectrum for detection of audio watermark 106.

According to one implementation, content 108 may be filtered so as to isolate a typical audio spectrum extending from approximately twenty hertz to approximately twenty kilohertz (20 Hz-20 kHz). The filtering is performed to filter out frequencies above the desired audio frequency spectrum range. However, in other implementations, other audio frequency spectra may be isolated by the filtering. For example, it is known in the art that audio watermarks are typically found in a frequency range between approximately 1 kHz and approximately 8 kHz. Consequently, in some cases, it may be advantageous or desirable to filter less than substantially the entirety of the typical audio spectrum, i.e., less than approximately 20 Hz to approximately 20 kHz, such as from approximately 500 Hz to approximately 10 kHz, for example, or any other desired frequency range.

Flowchart 400 continues with sampling the audio frequency spectrum to generate data 118 corresponding to content 108 including audio watermark 106 (430). As noted above, generation of data 118 corresponding to content 108 may be performed by watermark detection engine 116 of content distribution system 110, under the control of system processor 112. Data 118 may be generated by sampling the audio frequency spectrum extracted from content 108. In one implementation, the frequency spectrum may be sampled at approximately 48 kHz, for example, to generate data 118 corresponding to content 108 including audio watermark 106.

Flowchart 400 continues with determining a first audio level for searching data 118 based on the results of the sampling (440). Determination of the first audio level for searching data 118 may be performed by content distribution system 110, using watermark detection engine 116 under the control of system processor 112.

For example, in one implementation, an average audio level, or average volume, of content 108 may be calculated based on the sampling of the audio spectrum. Such an average audio level may be expressed in decibels relative to full scale (dBFS). Utilizing the average audio level as a reference threshold, a first audio level for searching for audio watermark 106 in content 108 may be determined. Because audio watermark 106 is typically included in content 108 at an audio level that is lower than the average audio level of content 108, determination of the first audio level for searching content 108 may include determining the first audio level for searching at a stepped down audio level relative to the average audio level. As a specific example, the first audio level for searching content 108 may be reduced by approximately 6 dB relative to the calculated average audio level.

Flowchart 400 continues with searching data 118 at the first audio for evidence of audio watermark 106 in content 108 (450). The search of data 118 may be performed by content distribution system 110, using watermark detection engine 116 under the control of system processor 112. In one implementation, for example, the searching may include sweeping substantially the entirety of data 118 in frequency increments of approximately 0.1 Hz, or greater, to detect the presence of single frequency tones in data 118. For example, where data 118 is generated by sampling of the audio frequency spectrum from approximately 20 Hz to approximately 20 kHz, the search may begin at the first audio level at data within data 118 corresponding to approximately 20 Hz of the audio spectrum, and may proceed in approximately 0.1 Hz steps at the first audio level to data within data 118 corresponding to approximately 20 kHz. It is noted that, as used in the present application, the expression "single frequency tone" refers to an audio tone having a frequency that substantially corresponds to a single identifiable frequency. For example, a single frequency tone at 5400 Hz describes a narrow audio signal having its peak or center frequency situated closer to 5400 Hz than to any adjacent frequency.

Detection of multiple, single frequency tones in data 118 may be interpreted as detection of audio watermark 106, and may result in identification of content 108 as watermarked content. For example, an audio watermark may include approximately ten such single frequency tones, although some audio watermarks may include more, or fewer than ten single frequency tones. Thus, according to one implementation, detecting audio watermark 106 includes filtering the audio frequency spectrum of content 108 (420), sampling the audio frequency spectrum to generate data 118 (430), determining the first audio level for searching data 118 based on the sampling (440), searching data 118 at the first audio level (450), and identifying content 108 as watermarked content when multiple, single frequency tones are detected.

In some instances, detection of audio watermark 106 may occur during, or as a result of, the search of data 118 at the first audio level. However, in some instances, audio watermark 106 may include single frequency tones at an audio level below the first audio level used for searching. Consequently, if the search at the first audio level fails to detect multiple, single frequency tones, the searching may be repeated at a lower audio level.

Thus, flowchart 400 may continue with repeating the search at successively lower audio levels until multiple, single frequency tones are found at an audio level above a lower bound audio level for the search (460). The continued search of data 118 may be performed by content distribution system 110, using watermark detection engine 116 under the control of system processor 112. In one implementation, for example, the searching may include sweeping substantially the entirety of data 118 as described above by reference to searching at the first audio level, at successively lower audio levels, such as audio levels reduced in successive steps of approximately 2 dB relative to the first audio level. In one implementation, a lower bound audio level for searching for audio watermark 106 may be approximately −100 dBFS, compared to the average audio level. The searching may continue until the multiple, single frequency tones identifying content 108 as watermarked content are detected, or until the lower bound audio level is reached. If the lower bound audio level is reached without detection of the multiple, single frequency tones characteristic of audio watermark 106, content 108 can be identified as non-watermarked from which audio watermark 106 is absent.

It is reiterated that the methods presented by flowcharts 300 and 400 may be performed so as to detect digital/audio watermark 106 without use of a watermark decoder, such as watermark decoder 134, in FIG. 1. In addition, the methods presented by flowcharts 300 and 400 may be performed in real-time relative to transmission stream 122. As a result, the systems and methods disclosed in the present application enable real-time identification of watermarked content without use of a watermark decoder configured to read the watermark included in the watermarked content. Consequently, the systems and methods disclosed in the present application advantageously enable prevention of unauthorized communications through the use of digital watermarks.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method comprising:
   receiving a content including an audio watermark encoded in the content;
   detecting that the audio watermark exists in the content;
   wherein the detecting of the audio watermark encoded in the content is performed without decoding the audio watermark encoded in the content, and includes:
   filtering an audio frequency spectrum of the content;
   sampling the audio frequency spectrum to generate data corresponding to the content;
   determining a first audio level for searching the data based on the sampling;
   searching the data at the first audio level for a plurality of single frequency tones; and
   identifying the content as watermarked content when the plurality of single frequency tones are detected by the searching.

2. The method of claim 1, wherein detecting the audio watermark further comprises:
   generating data corresponding to the content including the audio watermark; and
   searching the data to detect the audio watermark.

3. The method of claim 1, wherein the content comprises audio-visual content.

4. The method of claim 3, wherein the audio-visual content is scheduled for use in a transmission stream, the method enabling identification of the content as watermarked content in real-time with respect to the transmission stream.

5. The method of claim 1, wherein detecting the audio watermark further comprises repeating the searching at successively lower audio levels until the plurality of single frequency tones are detected at an audio level above a lower bound audio level for the searching.

6. A system comprising:
   a system processor and a system memory;
   a watermark detection engine stored in the system memory, the watermark detection engine, under control of the system processor, configured to:
   receive a content including an audio watermark encoded in the content;
   detect that the audio watermark exists in the content;
   wherein detection of the audio watermark encoded in the content is performed without decoding the audio watermark encoded in the content, and includes:
   filtering an audio frequency spectrum of the content;
   sampling the audio frequency spectrum to generate data corresponding to the content;
   determining a first audio level for searching the data based on the sampling;
   searching the data at the first audio level for a plurality of single frequency tones; and
   identifying the content as watermarked content when the plurality of single frequency tones are detected by the searching.

7. The system of claim 6, wherein the watermark detection engine is further configured to:
   generate data corresponding to the content including the audio watermark; and
   search the data to detect the audio watermark.

8. The system of claim 6, wherein the content comprises audio-visual content.

9. The system of claim 8, wherein the audio-visual content is scheduled for use in a transmission stream, the watermark detection engine configured to identify the content as watermarked content in real-time with respect to the transmission stream.

10. The system of claim 6, wherein the watermark detection engine is further configured to repeat the searching at successively lower audio levels until the plurality of single frequency tones are detected at an audio level above a lower bound audio level for the searching.

11. A computer-readable medium having stored thereon instructions which, when executed by a processor, instantiate a watermark detection engine configured to:

receive a content including an audio watermark encoded in the content;
detect that the audio watermark exists in the content;
wherein detection of the audio watermark encoded in the content is performed without decoding the audio watermark encoded in the content, and includes:
  filtering an audio frequency spectrum of the content;
  sampling the audio frequency spectrum to generate data corresponding to the content;
  determining a first audio level for searching the data based on the sampling;
  searching the data at the first audio level for a plurality of single frequency tones; and
  identifying the content as watermarked content when the plurality of single frequency tones are detected by the searching.

12. The computer-readable medium of claim 11, wherein the content comprises audio-visual content.

13. The computer-readable medium of claim 12, wherein the audio-visual content is scheduled for use in a transmission stream, the watermark detection engine configured to identify the content as watermarked content in real-time with respect to the transmission stream.

14. The computer-readable medium of claim 11, wherein the watermark detection engine is further configured to repeat the searching at successively lower audio levels until the plurality of single frequency tones are detected at an audio level above a lower bound audio level for the searching.

* * * * *